United States Patent

[11] 3,599,286

[72] Inventor James M. Karet
Worcester, Mass.
[21] Appl. No. 774,835
[22] Filed Nov. 12, 1968
[45] Patented Aug. 17, 1971
[73] Assignee Norton Company
Worcester, Mass.

[54] THERMALLY INSULATED EXTRUSION DIE AND METHOD OF MAKING
13 Claims, 5 Drawing Figs.
[52] U.S. Cl. .................................................. 18/12 A,
29/472.9, 117/70 C
[51] Int. Cl. .................................................. B29f 3/04
[50] Field of Search ........................................ 18/12 A, 13
D; 29/472.9, 473.1; 117/70 C

[56] References Cited
UNITED STATES PATENTS
3,054,694 9/1962 Aves, Jr. ..................... 117/70
3,230,582 1/1966 Hoffman et al. ............. 18/12
3,323,170 6/1967 Swickard, Jr. et al. ....... 18/12
3,427,685 2/1969 Grove et al. ................. 18/12
3,461,495 8/1969 Swickard et al. ............. 18/12

Primary Examiner—William S. Lawson
Attorney—Walter Fred

ABSTRACT: A heated die plate for a plastic pelletizer, construction and method for applying alternate layers of metal and ceramic thermal insulating material that fills the space between a plurality of extrusion nozzles, the final layer of ceramic material being sealed against penetration by cooling fluids and also having uniform wear resistant qualities to reduce uneven abrasion of the cutting face and of the cooperating cutting edge of a rotary knife passing over the cutting face.

PATENTED AUG 17 1971 3,599,286
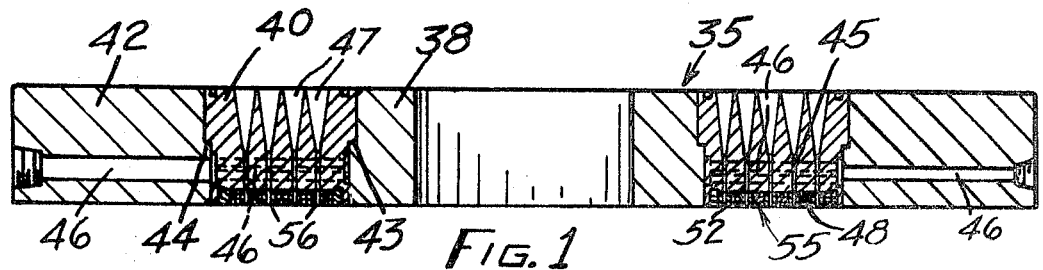
FIG.1
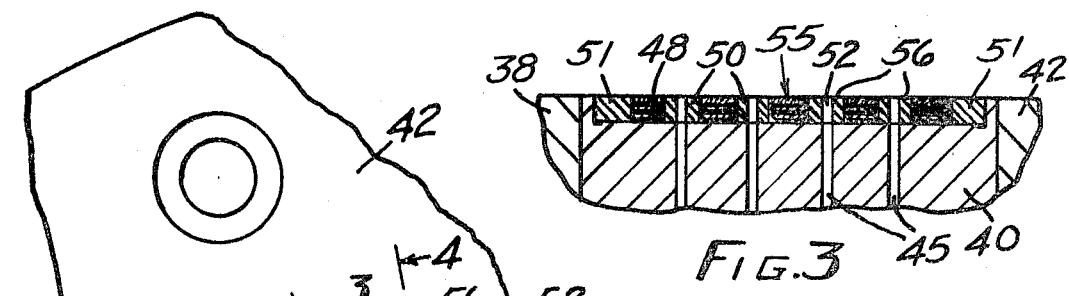
FIG.3
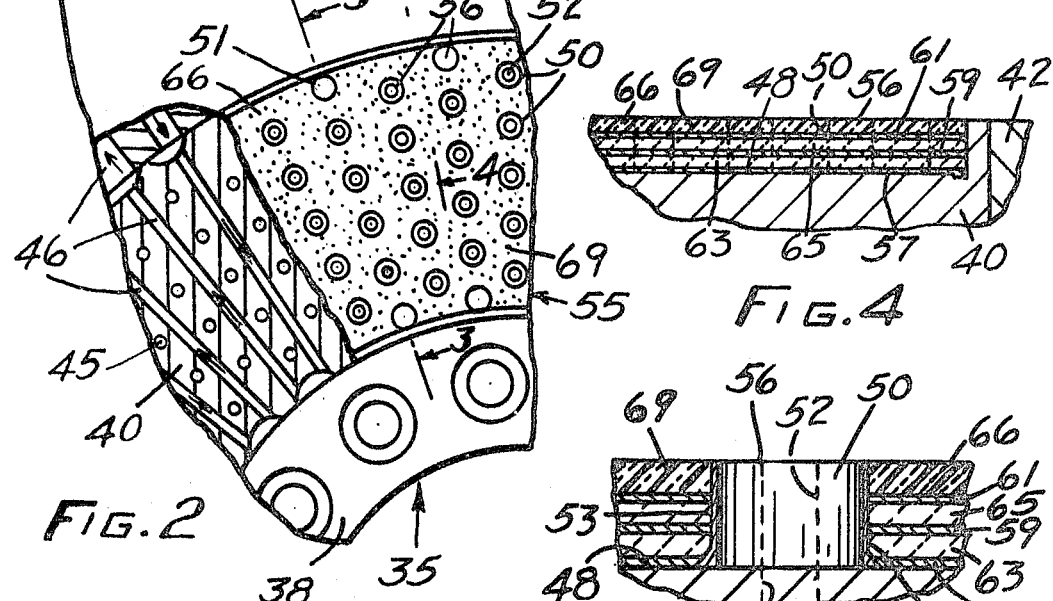
FIG.2
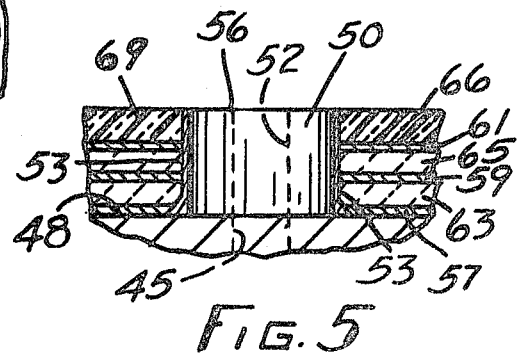
FIG.4
FIG.5
INVENTOR
JAMES M. KARET
BY
Walter Fred
AGENT

THERMALLY INSULATED EXTRUSION DIE AND METHOD OF MAKING

BACKGROUND OF THE INVENTION

The field of invention relates to extruding heated plastic material partially solidified with a coolant as it emerges from an extrusion die and particularly to a heated multihole extrusion die having thermal insulation around extrusion nozzles to prevent solidification of the plastic material within them. The ends of the nozzles together with the insulation form a planar cutting surface contacted by a rotary knife and the coolant.

Disclosed herein is an improvement on the multihole die such as is described in U.S. Pat. No. 3,323,170 wherein the thermal insulating material 55 of the patent comprises a single layer of fiberglass filled silicon-molding compound rammed into the space between the nozzles to prevent the too rapid cooling thereof by the pellet-entraining fluids.

It has been determined that the fiberglass filled silicon-molding compound is not entirely satisfactory for some applications. FOr example, it does not adhere particularly well to the nozzles and substrate and the uniform temperatures required cannot be maintained in some of the applications to which the die plate may be subjected. It is not capable of operating at elevated temperatures used for fluidizing some of the newer plastic materials that are subsequently used for manufacturing synthetic fibers. The single layer of insulating compound shown in the patent contains a large portion of metal which reduces the insulating effect of the glass fibers by conducting heat from the nozzles to the atmosphere and cooling fluid at the cutting face. Also, the cutting face, of which the insulating compound forms a part, spalls and wears unevenly because it has insufficient resistance to wear.

The present invention provides an improved die plate with a laminated composite of thermal insulation formed of materials which can better withstand and maintain higher uniform temperatures and thereby extend the utility of the die plate. The present insulating composite has thin layers of metal disposed between thicker barrier layers of ceramic insulating material, which metal increases the bond strength of the ceramic layers and can conduct heat between different areas of the body of the extrusion nozzles but cannot conduct heat to the atmosphere or coolant fluid zone. Further, the insulating material has superior resistance to wear and thereby provides a longer wearing cutting face. Similar metal-ceramic laminar coatings are disclosed in U.S. Pat. No. 3,054,694 for thermally insulating components. The present invention is an improvement in the plastic pelletizing extrusion nozzle art making use of such laminar coatings.

SUMMARY OF THE INVENTION

Briefly, the invention is concerned with an annular die plate having a plurality of thermally insulated nozzles which communicate with apertures in a die plate through which are extruded strands of plastic material and the method of insulating the nozzles. The die plate has other passages through which is circulated a heating medium to maintain the material to be extruded in a plastic state while it flows through the apertures in the die plate. The die plate has an annular recess on it exposed surface, from which extend the plurality of nozzles formed of a hard material.

A laminar composite of flame sprayed layers of metal and ceramic forms a thermal insulation that fills the space in the recess and surrounds the nozzles. The laminar layer comprises a thin metal undercoat such as nichrome applied to the surface of the recess in the die plate that then has a thicker layer of insulating material such as zirconium oxide deposited on the nichrome undercoat. A second thin metal undercoat such as molybdenum is then applied to the layer of zirconium oxide followed by a second thicker layer of zirconium oxide deposited on the molybdenum metal. A third thin coating of molybdenum metal is applied to the second layer of zirconium oxide a third and final layer of aluminum oxide being deposited on this last metal layer. The final layer of aluminum oxide is then ground to form a single plane that includes the end faces of all the nozzles. THe planar face cooperates with a rotary cutting knife.

Therefore, it is the primary object of the invention to provide a die plate for extruders having excellent properties of thermal insulation disposed about the extrusion nozzles and a method of thermally insulating the nozzles to prevent premature solidification of the plastic material passing therethrough. Another object is to provide a thermally insulated die plate with a wear resistant cutting face.

A further object of the invention is to provide a die plate with laminated ceramic thermal insulation about the nozzles.

A still further object is to provide an adherent, laminated, ceramic, thermal insulation with intermediate layers of metal, which insulation is disposed on the face of the die plate to surround the nozzles.

Other objects and advantages of the invention will become readily apparent by reference to the following detailed description. BRIEF DESCRIPTION OF THE DRAWING FIG. 1 is an axial sectional view through an annular die plate for a pelletizer;

FIG. 2 is an enlarged fragmentary end view partly in section of the exit and cutting face side of the die plate of FIG. 1;

FIG. 3 is an enlarged sectional view through a portion of the die plate taken on line 3-3 of FIG. 2 showing the nozzles, orifices, and the laminar insulation that surrounds the nozzles;

FIG. 4 is an enlarged sectional view through a portion of the die plate taken on line 4-4 of FIG. 2 showing the alternate layers of metal and ceramic material; and FIG. 5 is an enlarged view of a nozzle and adjacent portions of the multiple layers of metal and ceramic material, in section, which layers surround the nozzle. DESCRIPTION OF THE PREFERRED EMBODIMENTS In the drawings is shown an improved plastic pelletizing die plate which is similar to the die plate disclosed in U.S. Pat. No. 3,323,170 and to which reference may be had for details not disclosed herein. THe difference between the applicant's die plate and the one shown in the above mentioned patent resides in the improved multilayer thermal insulation which surrounds the extrusion nozzles to prevent solidification of the plastic material passing through them. Shown is an annular die plate 35 having center section 38, an intermediate section 40 and peripheral section 42 fixed together, as by welding, with the center section engaging annular shoulders 43 and 44.

The intermediate section 40 has a plurality of orifices or apertures 45 extending axially therethrough and arranged in radial rows around the entire annular section 40. Enclosed within section 40 and passing between the rows of apertures 45, are radially extending passages 46 through which is circulated a heating fluid such as steam, hot liquids, or other heat transfer medium to maintain the desired uniform temperature of the die plate. It is suggested that the die plate may be easily adapted to be heated in other well known conventional ways such as by circulating other heat transfer fluids or gasses in passages 46 or by providing suitable electrical heating means.

At the inlet side of the die the apertures 45 have conical-shaped portions 47. On the opposite outlet or exit side of the apertures in the die plate the intermediate section 40 has an annular recess including a floor or recessed surface 48. A plurality of cylindrical tungsten carbide nozzles 50 and a few wear stubs 51 extend outwardly from the recessed surface 48 within the recess. The nozzles 50 have orifices or apertures 52 which are aligned with and form extensions of the apertures 45. Alternatively the nozzles 50 and wear stubs 51 may be separate pieces of hardened steel or integrally formed parts of the intermediate section 40. The nozzles 50 and stubs 51 are preferably made of tungsten carbide and are fixed to the surface 48 by brazing metal 53 in the well-known manner. A thin wetting layer of the brazing metal 53 extends around the side peripheral surface of the nozzles.

Surrounding the nozzles 50 and filling the entire recess is a laminated composite of thermal insulation 55 extending to the cutting surface defined by the end faces 56 of the nozzles 50 and the ends of stubs 51. THe thermal insulation is built upon the surface 48 and comprises alternate substantially parallel layers of metal undercoats 57, 59 and 61 and ceramic overcoats 63, 65, and 66. THe pores in the final layer 66 are impregnated with a resinous material 69.

Preferably, the metal layer 57 is an alloy of nickel and chromium sometimes referred to as nichrome and which may be from 0.002 to 0.008 inch thick, that has preferably been flame sprayed to be bonded to the recessed surface 48.

To the layer 57 is mechanically bonded the ceramic layer 63 which is preferably a coating of preferably flame sprayed zirconium oxide 0.010 to 0.025 inch thick. Layer 59 is a coating of preferably flame sprayed molybdenum metal 0.002 to 0.008 inch thick to which is bonded another preferably flame sprayed layer 65 0.010 to 0.025 inch thick of zirconium oxide. To the layer 65 is bonded another flame sprayed layer 61 0.002 to 0.008 inch thick of molybdenum metal followed by the final preferably flame sprayed ceramic layer 66 of aluminum oxide 0.015 to 0.030 inch thick. THe pores of the final aluminum oxide layer are filled with a resinous material 69 which is preferably a silicone resin.

The metal and ceramic layers may be applied in any well-known manner which will provide good adherence. However, the preferred method is that of flame-spraying molten particles of metal and ceramic materials with commercially available oxyacetylene guns.

Alternatively, the metal undercoats and/or the ceramic layers may be of the same materials throughout or combinations of the materials disclosed arranged in a different sequence. Obviously the laminated insulating composite may comprise any number of metal-ceramic layers but preferably two or more layers are provided depending on the depth of space or recess to be filled and the amount of thermal insulation required.

Various other combinations of metals and ceramic materials including the method of applying them may be used as disclosed in U.S.Pat. No. 3,054,694. THe selection of materials depends on their properties which suit the particular application in which the die plate is utilized.

It is known that zirconium oxide is a better thermal insulator than aluminum oxide and for this reason is placed adjacent the recessed surface 48 that is heated by the means 46 disposed in the body 40. However, aluminum oxide is a satisfactory insulator that has better wear resistant properties than zirconium oxide, therefore, aluminum oxide is used as the final layer to resist wear that is produced when the conventional rotary knife passes over the cutting face of the die plate. Chromium oxide may be substituted for aluminum oxide as chromia also has excellent wear resistant qualities.

Each of the metallic layers acts as an excellent bonding agent to which the ceramic materials adhere readily. Each of the intermediate layers of ceramic materials acts to insulate the metal layer onto which it is applied and tends to prevent transfer of heat between the metal layers and to the cooling fluid contacting the cutting face of the die.

WHile molybdenum and nichrome metal undercoats are preferred other metals may be substituted for or used in combination therewith depending on the environment to which the die is subjected. Some of the metals can be successfully flame sprayed and which provide an excellent bond are beryllium, chromium, cobalt, columbium, molybdenum, nickel, platinum, rhodium, tantalum, tungsten, vanadium, zirconium, titanium and alloys thereof.

Likewise, flame-sprayed chromia, magnesia, magnesium aluminate, zirconia, zirconium silicate, beryllia, chromium carbide, aluminum silicate, titanium carbide and combinations thereof may be substituted for or used in combination with the preferred alumina and zirconia ceramic materials.

THe slight porosity of flame-sprayed ceramic coatings is a factor contributing to their excellent insulating qualities. Air entrapped within the pores enchances the thermal insulating and shock resistant qualities of the materials. However, the pores in the final ceramic layer are filled with a resin to inhibit a direct heat transfer to the atmosphere or to the cooling fluid which would otherwise penetrate the final ceramic layer to the heat-conducting metal undercoat 61 extending between the nozzles.

Various suitable resinous materials may be used to impregnate the final ceramic layer such as epoxy, polyester, polyurethane, and silicone resins manufactured by the Dow COrning, Union Carbide, and General Electric companies.

A representative process of making the thermally insulate extrusion die of the invention is as follows:

The metal die plate is constructed as hereinabove disclosed or a modification thereof constructed to have one or more apertures and associated nozzles through which the heated material is to be extruded. The nozzles may extend from the base surface 48 a predetermined distance to the plane of a cutting face that is contacted by the rotary knife edge. When the nozzles are separate pieces of hard tungsten carbide brazed to the base surface a thin wetting layer 0.005 to 0.020 inch thick of the brazing material such as silver solder is extended over the side peripheral surfaces of the nozzles to the end faces. The thin layer of silver solder wets the surface of the rather smooth tungsten carbide so the metal and ceramic layer will bond satisfactorily thereto.

Next, the exposed portions of the die plate not to be coated, that is the end faces of the nozzles, and walls of the apertures etc., are masked off. The exposed base or recessed metal surface and side peripheral surfaces of the nozzle or the wetting layer in the case of tungsten nozzles, are cleaned and roughened as by blasting with abrasive grit in the well-known manner.

The multilayer composite of alternate metal and ceramic insulating material is then built upon the base metal surface. The materials may be applied, for example, by flame spraying them in rod form utilizing substantially the method and apparatus disclosed in U.S.Pat. No. 2,707,691 and 3,261,673. Alternatively, the materials may be supplied in particle form using the conventional powder flame spraying method and apparatus disclosed in U.S.Pat. No. 3,054,694. At least two alternate layers of metal and ceramic material are applied so that the final ceramic layer extends at least to, but preferably beyond the end faces of the nozzles. The end faces of the nozzles and the final ceramic layer are then simultaneously ground to a single plane which provides a smooth and flat wear resistant bearing surface for the cutting knife. The final layer is then impregnated with a liquid silicone resin to fill the pores therein. THe impregnating step takes from 10 minutes to 3 hours depending on the thickness and the particular material used for the final layer. Lastly, the resin is cured in an oven from 10 to 50 minutes at a temperature of from 300° F. to 550° F.

An example of thermally insulating a die plate constructed as shown and described above according to the invention is as follows:

A die plate made of SAE 4140 Steel had a central annular recessed surface approximately 0.009 inch deep below the exposed end faces of the tungsten carbide nozzles.

Silver solder was used to weld the nozzles to the recessed surface, leaving a layer 53 approximately 0.010 inch thick on the sides of the nozzles to wet them. A steel nail with a head slightly larger in diameter than the diameter of the nozzles was inserted into each aperture to mask off the area of the end faces of the nozzles. The recessed surface, its adjacent side surface, the surfaces of the brazing material and wetting layers on the sides of the nozzles, were all cleaned and roughened with abrasive grit projected at a pressure of approximately 40 pounds per square inch. Using a Metco metallizing gun, particles of nichrome metal wire were flame sprayed onto and bonded to the roughened surfaces in the recess to produce the first metal undercoat 57 averaging 0.006 inch thick. Zirconium oxide was then flame sprayed onto and bonded to the first metal undercoat with a rod gun of the type disclosed in Pat. No. 2,707,609 until a layer 63 approximately 0.020 inch thick was built. Next, molybdenum metal in wire form was flame sprayed onto and bonded to the first zirconium oxide layer with the Metco gun until a second metal undercoat layer 59 about 0.006 inch was obtained. Thereafter, a second zirconium oxide layer 65 approximately 0.020 inch thick was flame sprayed and bonded to the second metal undercoat. Then a third metal undercoat layer 61 of molybdenum about 0.006 inch thick was flame sprayed onto and bonded to the second layer of zirconium oxide. Finally, a layer 66 approximately 0.035 inch thick of aluminum oxide was flame sprayed onto and bonded to the third metal undercoat in the same manner as was the zirconium oxide layers.

Great care was taken in spraying the materials so that the individual layers do not build up a laminar composite along the side peripheral surface of nozzles. A slight amount of build up is permissible but any excess material must be removed. Preferably, each of the layers extends to and is bonded to the peripheral side surface of the nozzles or to the wetting layer of brazing material on the sides of the tungsten carbide nozzles. The nails with large heads switch cover and provide a slight overhang over the exposed ends of the nozzles are one of many successful means for preventing the layers form building up on the side peripheral surface and end faces of the nozzles.

THe amount of air pressure, controls, operation of the flame spray guns and composition of the various metal and ceramic materials need not be described as all this is well known in the art and described in the aforesaid patents.

After the final layer of aluminum oxide was applied the masking nails were removed. The exposed surface of the final layer and the nozzle end faces were simultaneously ground down with a diamond wheel to a single fat plane. Thus was produced a smooth flat bearing surface for coaction with the cutting knife, the surface having only the end faces of the nozzles exposed, along with the ground surface of the final ceramic layer extending between the nozzles.

Lastly, a commercially available liquid silicone resin SR 119 marketed by General Electric, Waterford, New York, was applied to the cutting face and allowed to penetrate the layer of aluminum oxide for 25 minutes before removing the excess resin. The resin was then cured for 25 minutes at a temperature of 400° F. before using the die plate.

While the preferred embodiment of the invention has been described, it is to be understood as not limited thereto, as many modifications may be made of the invention without departing from the scope of the appended claims.

What I claim is:

1. The combination with a heatable extrusion die plate having an inlet side and an outlet side, a plurality of spaced nozzles projecting from a base surface, extending between the nozzles and adjacent the outlet side, to end faces of the nozzles at the outlet side of the die plate; and apertures extending from the inlet side through the nozzles to the outlet side wherein material passing therethrough may be heated and maintained at substantially uniform temperature to prevent solidification of the material before being discharged, wherein the improvement comprises:
a laminar composite, having alternate bonded layers of metal and ceramic thermal insulation, bonded to the base surface and which extends around and fills all space between the nozzles to the end faces which together provide a single flat wear resistant surface at the outlet side of the die plate.

2. THe combination recited in claim 1 wherein the metal is selected from a group consisting of molybdenum, chromium, nickel, platinum, beryllium, cobalt, columbium, rhodium, tantalum, tungsten, vanadium, zirconium, titanium, and alloys thereof, and the ceramic thermal insulation is selected from a group consisting of alumina, zirconia, chromia, magnesia, magnesium aluminate, zirconium silicate, beryllia, chromium carbide, aluminum silicate, titanium carbide, and combinations thereof.

3. The combination with a heatable extrusion die plate having an inlet side and an outlet side, a plurality of spaced nozzles projecting from a base surface, extending between the nozzles and adjacent the outlet side, to end faces of the nozzles at the outlet side of the die plate; and apertures extending from the inlet side through the nozzles to the outlet side wherein material passing therethrough may be heated and maintained at substantially uniform temperature to prevent solidification of the material before being discharged, wherein the improvement comprises:
a laminar composite having at least two alternate bonded flame sprayed layers of metal selected from a group consisting of molybedenum, chromium, nickel, platinum, beryllium, cobalt, columbium, rhodium, tantalum, tungsten, vanadium, zirconium, titanium, and alloys thereof; and
at least two alternate bonded flame-sprayed layers of ceramic thermal insulation, one of which is a final layer with a wear-resistant surface thereon extending to the end faces of the nozzles at the outlet side, of material selected from a group consisting of alumina, zirconia, chromia, magnesia, magnesium aluminate, zirconium silicate, beryllia, chromium carbide, aluminum silicate, titanium carbide, and combinations thereof; the laminar composite being bonded to the base surface, extends around and fills all space between the nozzles to the end faces which together with the final layer provide a single flat-wear resistant surface at the outlet side of the die.

4. The combination recited in claim 3 wherein the laminar composite comprises:
a first layer of the metal bonded to the base surface;
a first layer of ceramic thermal insulation bonded to the first layer of metal;
a second layer of metal bonded to the first layer of ceramic thermal insulation;
a second layer of ceramic thermal insulation bonded to the second layer of metal;
a third layer of metal bonded to the second layer of ceramic thermal insulation; and
a third resin impregnated layer of ceramic thermal insulation, including the wear-resistant surface thereon, bonded to the third layer of metal.

5. The combination recited in claim 4 wherein each of the layers of metal is molybdenum, and wherein each of the layers of ceramic thermal insulation is zirconia or alumina.

6. The combination recited in claim 4 wherein each of the layers of metal is nichrome; and
wherein each of the layers of ceramic thermal insulation is alumina or zirconia.

7. The combination recited in claim 4 wherein the first layer of metal is nichrome and each of the second and third layers of metal is molybdenum; and
each of the first and second layers of ceramic thermal insulation is zirconia and the third layer of ceramic thermal insulation is alumina or chromia impregnated with a silicone resin applied to the wear-resistant surface.

8. The combination recited in claim 4 wherein the first layer of metal is nichrome and each of the second and third layers of metal is molybdenum; and
each of the first and second layers of ceramic thermal insulation is alumina; and
the third layer of ceramic thermal insulation is chromia or alumina.

9. The combination recited in claim 7 further comprising: a layer of brazing metal on the nozzles surface extending from the base surface to the end faces thereof.

10. A method of thermally insulting a plurality of spaced nozzles extending from a base surface to end faces of the nozzles and providing a single flat wear resistant surface together with the end faces on an outlet side of a heatable extrusion die plate having apertures extending from an inlet side through the nozzles to the end faces on the outlet side comprising the steps of:
masking of the end faces of the nozzles;
roughening the base surface around and between the nozzles and exposed surfaces of the nozzle;

applying at least two alternate layers of metal and ceramic thermal insulation from the base surface with a final layer of the ceramic insulation extending to at least the end faces, so that a bonded laminar composite of the metal and ceramic thermal insulation extends around end fills all space between the nozzles and is bonded to the base surface;

removing the masking; and grinding the end faces and the final ceramic layer to provide a single flat wear-resistant surface on the outlet side of the die plate.

11. The method according to claim 10 further comprising the additional steps of:

impregnating the final ceramic layer of ceramic insulation and sealing the flat wear resistant surface thereon with a resin; and curing the resin.

12. THe method according to claim 11 wherein the masking step comprises:

inserting into the aperture nails having large heads which extend over the end faces.

13. The method according to claim 11 further comprising:

wetting the surfaces of the nozzles with brazing metal to the end faces before the roughening step.